United States Patent
Kim et al.

(10) Patent No.: US 7,155,030 B2
(45) Date of Patent: Dec. 26, 2006

(54) CAMERA CALIBRATION SYSTEM USING PLANAR CONCENTRIC CIRCLES AND METHOD THEREOF

(75) Inventors: Jun-Sik Kim, Seoul (KR); In-So Kweon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 94 days.

(21) Appl. No.: 11/074,562

(22) Filed: Mar. 8, 2005

(65) Prior Publication Data

US 2005/0207640 A1 Sep. 22, 2005

Related U.S. Application Data

(63) Continuation-in-part of application No. 09/919,086, filed on Jul. 31, 2001, now abandoned.

(30) Foreign Application Priority Data

Apr. 2, 2001 (KR) ................ 2001-17418

(51) Int. Cl.
  *G06K 9/00* (2006.01)
(52) U.S. Cl. ............. 382/100; 382/154; 356/127; 356/606; 359/664
(58) Field of Classification Search ............. 382/106, 382/154, 275, 294, 296; 348/39, 38, 37, 348/36, 92, 42, 187, 335, 188, 340, 360; 356/515, 127, 603, 606; 359/662, 664
  See application file for complete search history.

(56) References Cited

U.S. PATENT DOCUMENTS

| | | | |
|---|---|---|---|
| 5,054,907 A * | 10/1991 | Sklar et al. .................. 351/212 |
| 5,559,334 A | 9/1996 | Gupta et al. | |
| 5,886,767 A * | 3/1999 | Snook ........................ 351/212 |
| 5,918,196 A | 6/1999 | Jacobson | |
| 6,088,098 A | 7/2000 | Arndt et al. | |
| 6,195,455 B1 | 2/2001 | Mack et al. | |
| 6,437,823 B1 | 8/2002 | Zhang | |
| 6,671,400 B1 | 12/2003 | Ekpar et al. | |
| 6,750,860 B1 | 6/2004 | Shum et al. | |
| 6,985,183 B1 * | 1/2006 | Jan et al. ..................... 348/335 |
| 6,995,762 B1 * | 2/2006 | Pavlidis et al. ............. 345/419 |

OTHER PUBLICATIONS

Kim, J., et al., "Camera Calibration Using Projective Invariance of Concentric Circles", *Thesis of The 13th Workshop for Processing and Understanding an Image*, pp. 543-548 (Jan. 10-12, 2001).

Tsai, R.Y., "A Versatile Camera Calibration Technique for High-Accuracy 3D MAchine Vision Metrology Using Off-the-Shelf Cameras and Lenses", *IEEE Journal of Robotics and Automation*, vol. RA-3, No. 4, pp. 323-344 (Aug. 1987).

Kanatani, K., et al., "3D Interpretation of Conics and Orthogonality", *CVGIP: Image Understanding*, vol. 58, No. 3, pp. 286-301 (Nov. 1993).

* cited by examiner

*Primary Examiner*—Sheela Chawan
(74) *Attorney, Agent, or Firm*—Akin Gump Strauss Hauer & Feld, LLP

(57) ABSTRACT

The invention relates to a camera calibration system and method thereof which is capable of easily performing camera calibration using a concentric circle pattern. According to the invention, a method of calibrating a camera calibrates the intrinsic parameters of the camera required to measure geometric information of an object using projection invariable characteristics of concentric circles. The method includes the steps of taking images of the calibration pattern consisting of two or more concentric circles located in the same plane and having different radius at different angles to obtain projected images calculating the central point of the projected images using a given algorithm, and calculating the principal point and focal point of camera using a nonlinear minimization algorithm based on the central point thus obtained.

6 Claims, 7 Drawing Sheets

(a)    (b)

(a)    (b)

CAMERA CALIBRATION SYSTEM USING PLANAR CONCENTRIC CIRCLES AND METHOD THEREOF

CROSS-REFERENCE TO RELATED APPLICATIONS

This application is a continuation-in-part of application Ser. No. 09/919,086, filed Jul. 31, 2001 now abandoned, entitled "Camera Calibration System Using Planar Concentric Circles and Method Thereof", the contents of which are incorporated herein in their entirety.

TECHNICAL FIELD

The invention relates generally to a method of calibrating a camera for obtaining the camera's intrinsic parameters required when the camera is used to obtain geometric information. More particularly, the invention relates to a camera calibration system and method thereof, which uses a concentric circle pattern as an artificial calibration pattern in the process of calibrating the camera to obtain the camera's intrinsic parameters by analyzing two images of the concentric circle pattern taken at different angles.

BACKGROUND OF THE INVENTION

To obtain geometric information of an object using a camera, it is required to calibrate the camera by estimating intrinsic parameters between the image information obtained from the camera and the actual geometric information of the object. FIG. 1 illustrates an image of a 3D artificial calibration object model in a conventional method of calibrating a camera using 3D calibration object and FIG. 2 is an image of a plane model in a conventional method of calibrating a camera using coordinates of points on a two-dimensional plane.

Conventional methods for calibrating a camera includes: (1) a calibration method using a 3D calibration object, (2) a self calibration method, and (3) a calibration method using coordinates of points on a two-dimensional plane.

A first calibration method, widely used so far, is one to calibrate the camera using a 3D artificial calibration object, such as a rectangular parallelepiped calibration object, as shown in FIG. 1. As can been seen from FIG. 1, a photograph of the rectangular calibration object is taken to obtain a geometric relation of the rectangular parallelepiped object.

However, in the first method of calibrating a camera using a 3D artificial calibration object, it is difficult to manufacture and maintain the calibration object of a rectangular parallelepiped. This is because the calibration object should have the characteristic of a normal rectangular parallelepiped in order to calculate the intrinsic parameters of the camera from its image. In other words, it must be a rectangular parallelepiped in which three plane and twelve edges must maintain a right angle with respect to a vertex. Otherwise, exact calculation of the camera's intrinsic parameters become difficult and the reliability of calibration is degraded accordingly.

A second self calibration method is one to calculate the intrinsic parameters of the camera using only information of each of corresponding points from several sheets of images. Although this self calibration method can be widely applied without the limitation of using an artificial calibration object, it is difficult to exactly define the corresponding points. Due to this, this method has problems that the process of finding a solution is very complicated and it is also difficult to find a correct solution.

A third method, as shown in FIG. 2, is one of calibrating the coordinates of the points on a plane. As shown in FIG. 2, this method estimates the intrinsic parameters of the camera by taking several images of the plane pattern to exactly find the coordinates of the points on a plane and the coordinates of the corresponding points on a corresponding image plane.

In the mean time, if a circle image is taken by a camera such that a principal point and a focal length are given, a method for calculating a distance to a central point of the circle from the camera has been studied. For example, a paper by K. Kanatani and W. Liu, "3D Interpretation of Conics and Orthogonality", CVGIP: Image Understanding, vol. 58, No. 3, November. Pp. 286–301, 1993, describes such method (See Equations 57 and 58 of the above paper). Using rough initial guesses for the intrinsic parameters with some knowledge about cameras such as sensor cell size, the circle pose in 3D space can be estimated. Using the circle pose estimation algorithm described in the above-mentioned paper, the 3-D position of the circle supporting plane, normal vector and distance, denoted by $\bar{n}$ and d can be found.

For this method of using the coordinates of the points on a plane, one can manufacture and maintain a 2D plane pattern easier than the method of using a 3D artificial calibration object. However, this method is very complicated since it must use a plurality of calibration points of the images of a plane and compare them to each other.

SUMMARY OF THE INVENTION

It is therefore an object of the present invention to provide a system for calibrating intrinsic parameters using projection invariable characteristics of a concentric circle and a method thereof, which is able to use a plane pattern and increase the reliability of calibration, and calculate intrinsic parameters of a camera without identifying the corresponding points.

One aspect of the invention is a method of calibrating a camera using projection invariable characteristics of a concentric circle in order to calibrate the camera through a calculation of camera's intrinsic parameters, the method comprises steps of;

a) taking a plurality of images of a calibration pattern consisting of two or more concentric circles located at a same plane and having different radiuses at different angles to obtain projected images resulted from the projection of the concentric circles;

b) calculating central points of the projected images using a given algorithm; and c) calculating an optimum principal point $(u_0, v_0)$ and focal length $(f)$ of the camera using a nonlinear minimizing method based on a given principal point and focal length, which are the camera's intrinsic parameters, and the central point of the projected images calculated in the step b), where the concentric circle includes two circles and the step b) includes the steps of:

d) calculating the central points (O) of the two projected images obtained from the step a) to obtain a straight line passing through the central points;

e) calculating crossing points of the straight line and the two projected images; and f) calculating the central point of the projected images using a cross ratio depending on the central point (O) of the projected images, a given point $(M_\infty)$ infinitely separated from the central point (O) on the straight line passing through the central points (O), and the crossing points of the straight line and the projected images.

Another aspect of the invention is a system for calibrating intrinsic parameters of a camera using projection invariable characteristic of a concentric circle in order to calibrate the camera through a calculation of camera's intrinsic parameters, comprising; a camera that an arbitrary principal point and an arbitrary focal length are preset; a calibration pattern located on a same plane and consisting of two or more concentric circles having different radiuses, said pattern being taken by the camera in order to calibrate the camera's intrinsic parameter; and a controller for calculating a straight line connecting the central points of the projected images obtained by projecting the calibration pattern to the camera at a given angle, and finding crossing points of the straight line and the projected images to obtain the central point coordinate of the projected images using a cross ratio (Cr), and calculating an optimum principal point $(u_0, v_0)$ and focal length $(f)$ of the camera using a nonlinear minimizing method based on the obtained principal point and focal length, which are the camera's intrinsic parameters, wherein, the controller assuming that normal vectors $(\bar{n})$ of the plane and distance (d) from a central coordinate of the camera of each of the calculated central point based on a principal point $(u_0, v_0)$ and focal length $(f)$ of the camera, calculating $F(u_0, v_0, f)$ by applying the assumed normal vectors and focal length to a cost function defined as below Equation 3, and setting up an optimum principal point and focal length of the camera when $F(u_0, v_0, f)$ is minimized.

$$F(u_0, v_0, f) = \qquad \text{[Equation 3]}$$
$$\alpha(\bar{n}_1 - \bar{n}_2)^2 + \beta(\bar{n}_3 - \bar{n}_4)^2 + \gamma(d_1 - d_2)^2 + \lambda(d_3 - d_4)^2 +$$
$$\rho_1 \sum |R_{C_1}(n_1, d_1) - R_1| + \rho_2 \sum |R_{C_2}(n_2, d_2) - R_2| +$$
$$\rho_3 \sum |R_{C_3}(n_3, d_3) - R_3| + \rho_4 \sum |R_{C_4}(n_4, d_4) - R_4|$$

(where $R_i$ is radius of the circle i, and $R_{ci}(n_i, d_i)$ is radius estimation function between points of the projected image Ci and center of the projected image. $\alpha, \beta, \gamma, \lambda, \rho_1, \rho_2, \rho_3$, and $\rho_4$ are the weighting factors representing the confidence of each constraint.)

BRIEF DESCRIPTION OF THE DRAWINGS

The aforementioned aspects and other features of the present invention will be explained in the following description, taken in conjunction with the accompanying drawings, wherein:

FIG. 4b illustrates images where boundary lines are extracted from the ellipses in FIG. 4a;

DETAILED DESCRIPTION OF THE INVENTION

Figure 1:
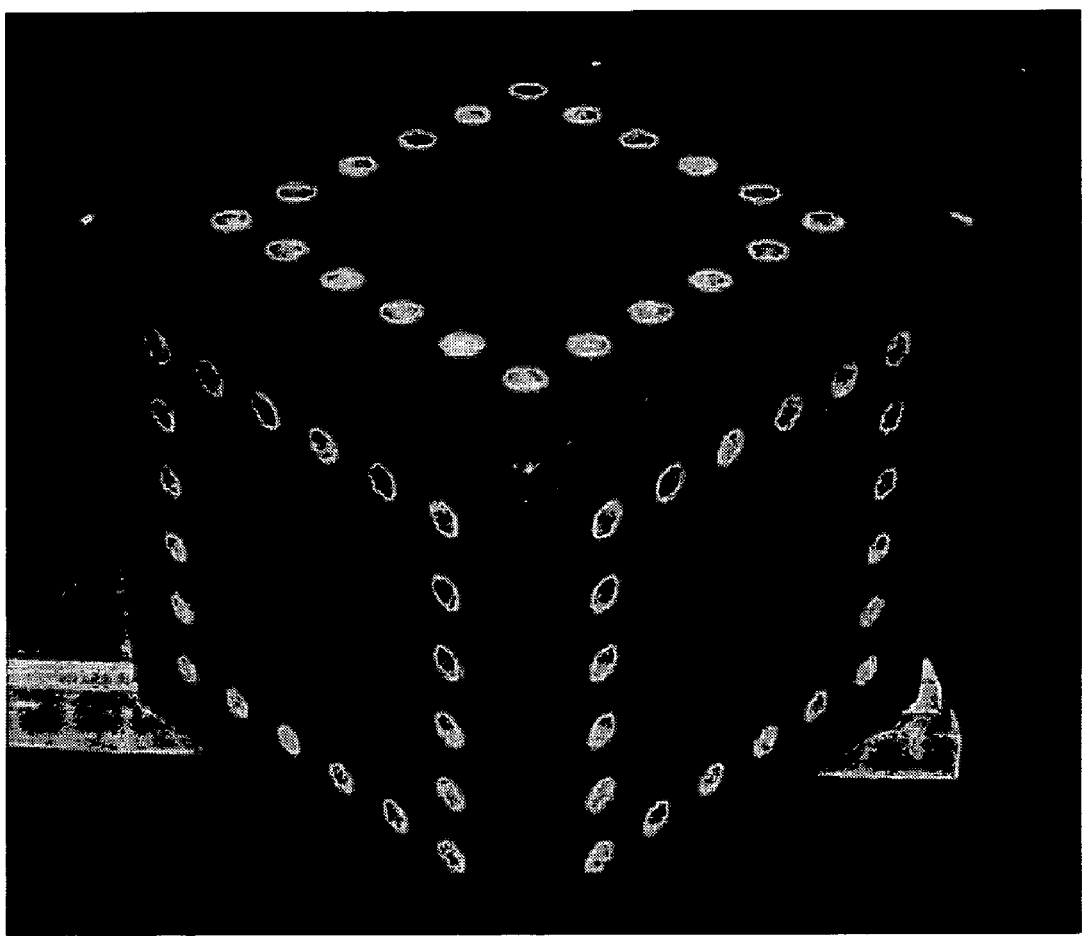
FIG. 1 illustrates an image of a 3D artificial calibration object model taken in a conventional method of calibrating a camera using a 3D calibration object.
Figure 2:
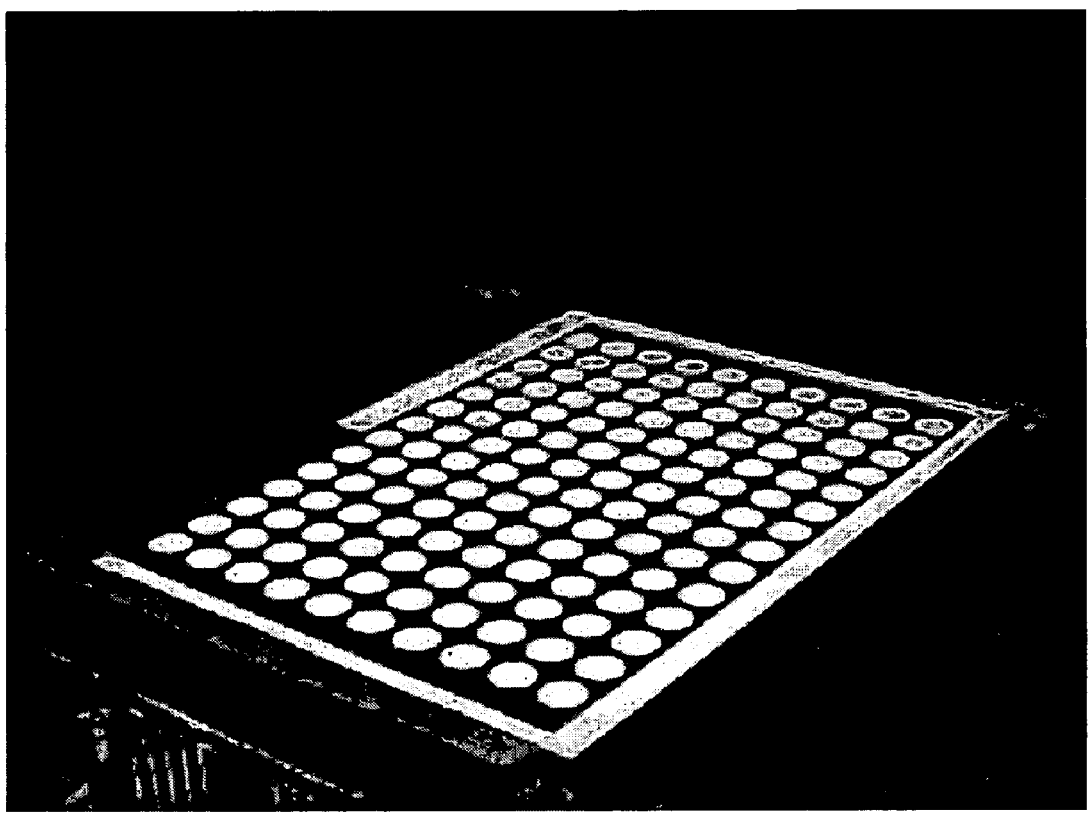
FIG. 2 is an image of a plane model taken in a conventional method of calibrating a camera using coordinates of points on a two-dimensional plane.

The present invention will be described in detail by way of a preferred embodiment with reference to accompanying drawings, in which like reference numerals are used to identify the same or similar parts.

Figure 3:
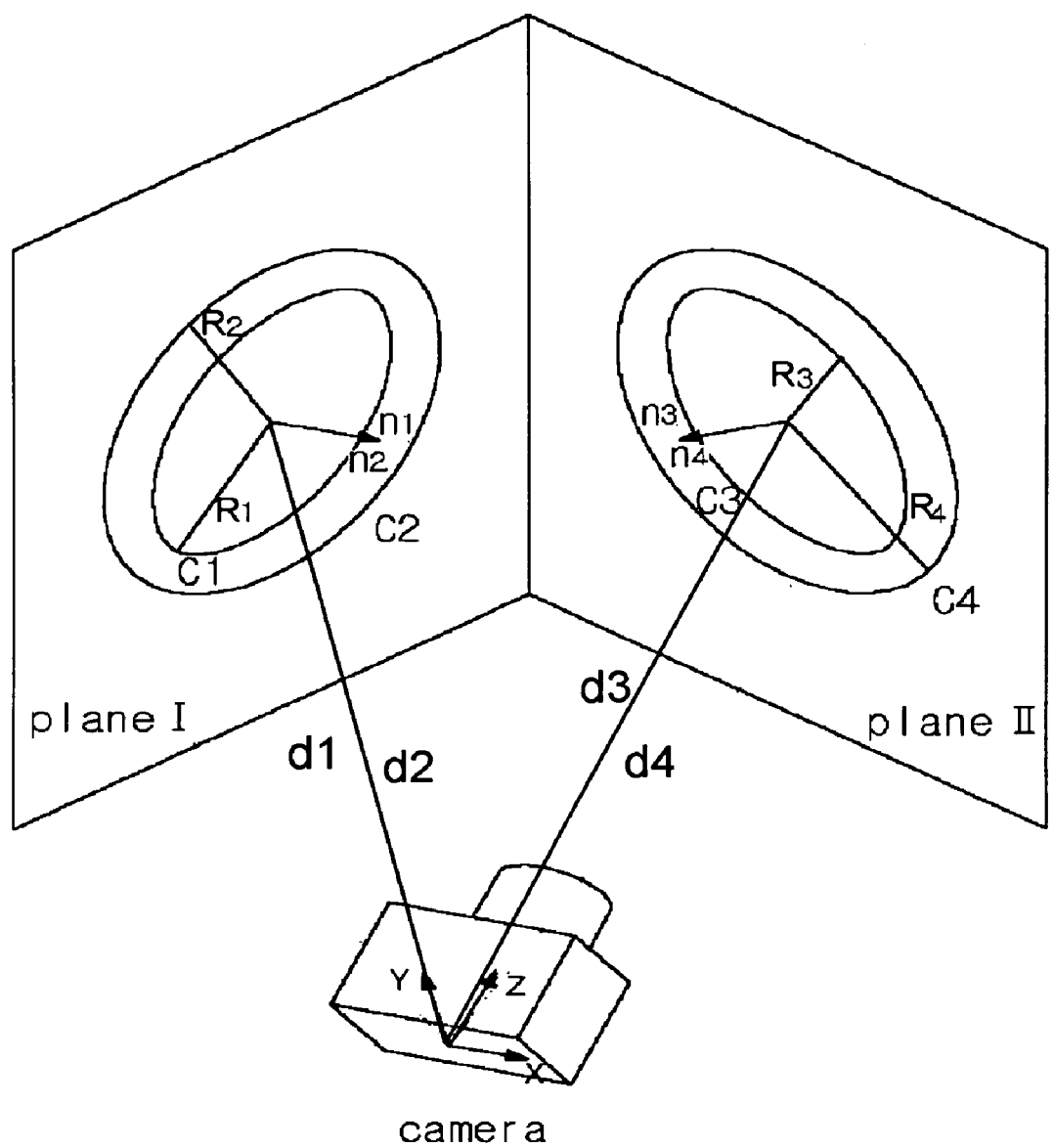
FIG. 3 is a conceptual view showing images of a concentric circle pattern taken at different angles in a method of calibrating camera intrinsic parameters using a concentric circle pattern according to one embodiment of the present invention.
Figure 4A:
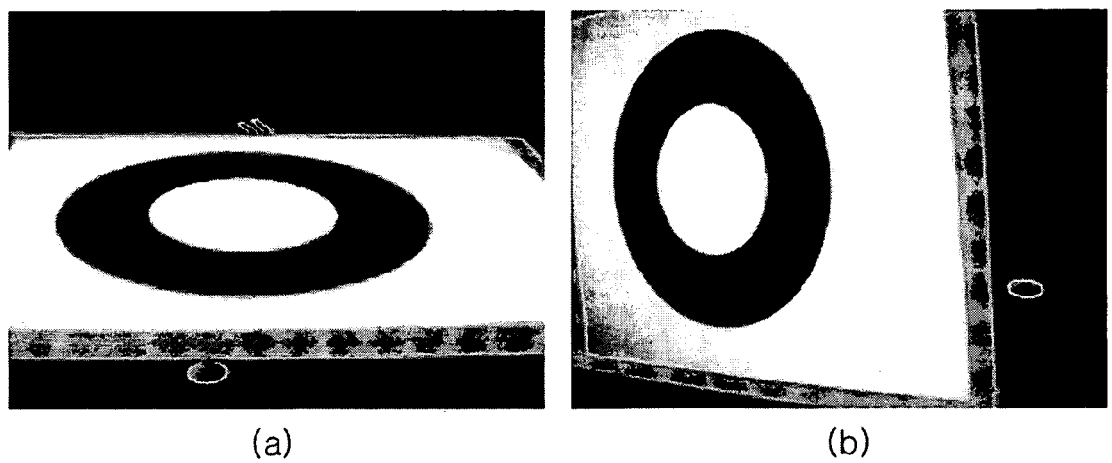
FIG. 4a illustrates two images showing a concentric circle taken at different angles in FIG. 3.
Figure 4B:
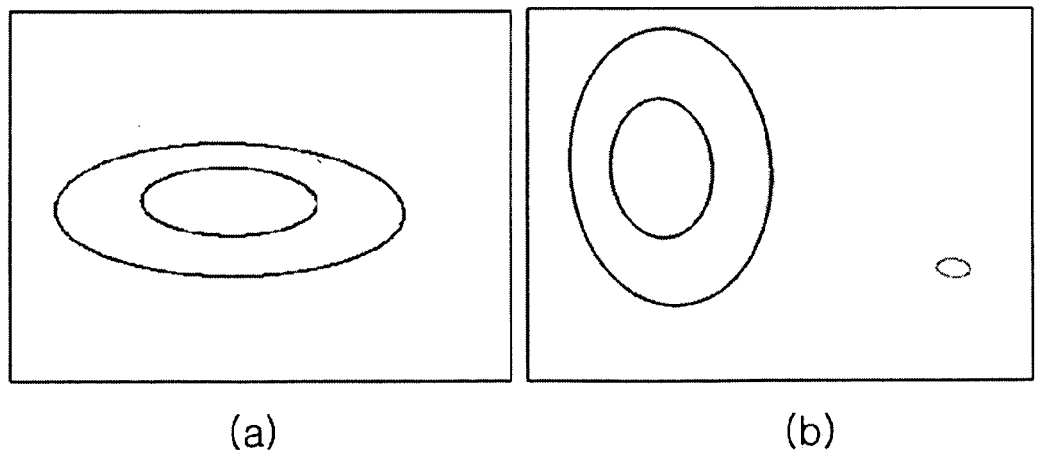
Figure 5:
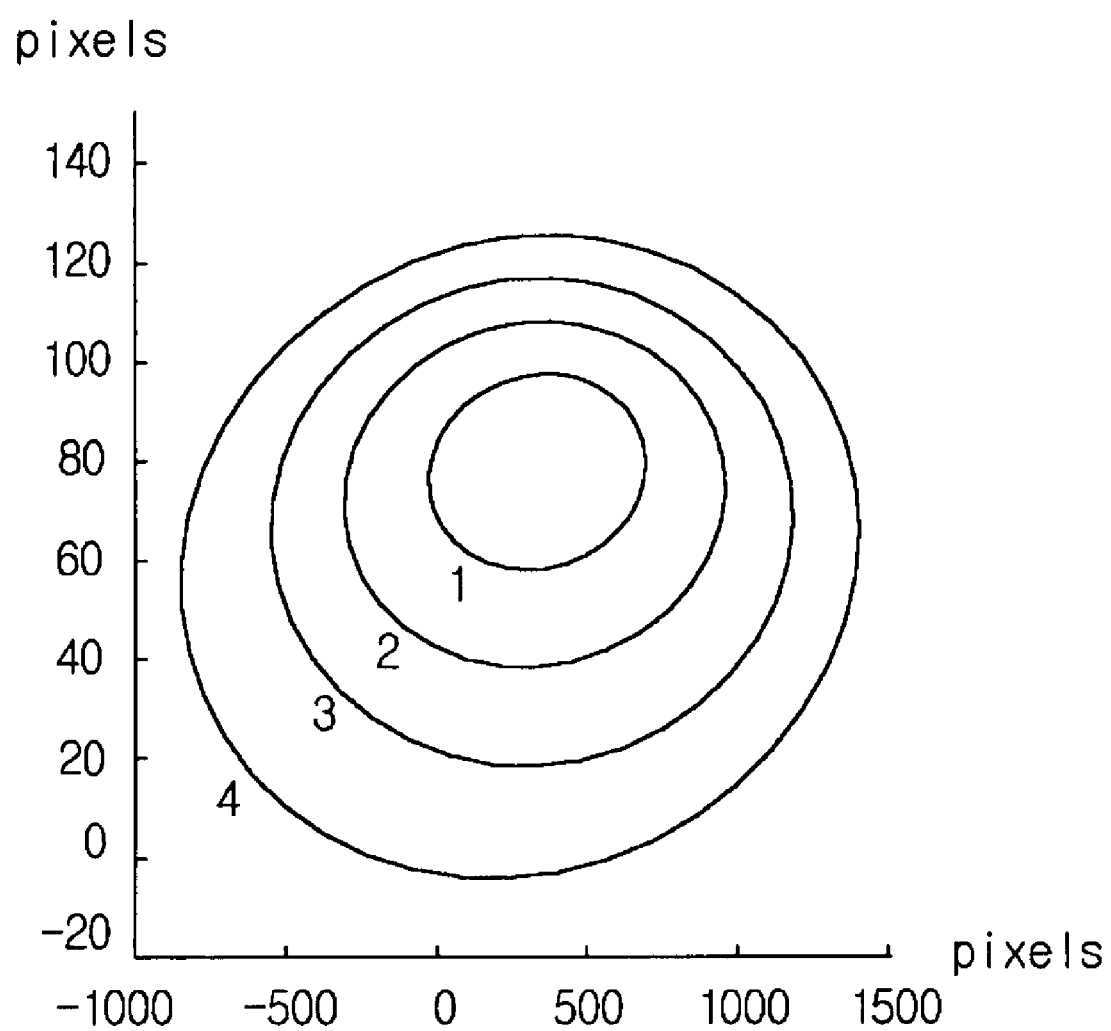
FIG. 5 is an image showing the central points of the ellipses in FIG. 4b.
Figure 6:
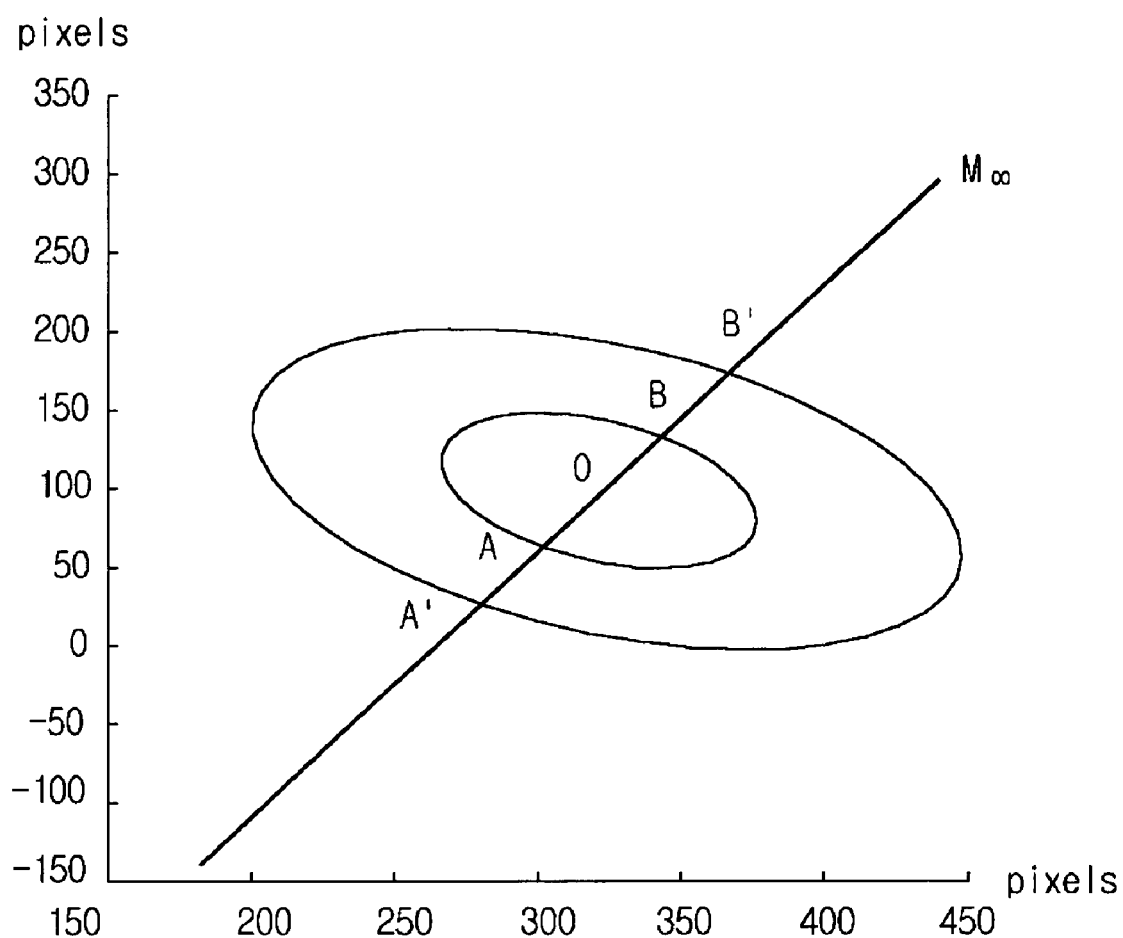
FIG. 6 is an image showing a straight line connecting the central points of the ellipses in FIG. 5.
Figure 7:
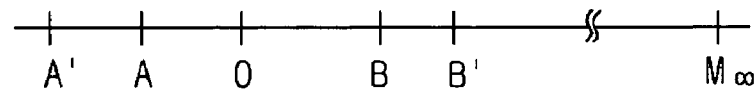
FIG. 7 illustrates a position relation of the points on the straight line in FIG. 6.
Figure 8:
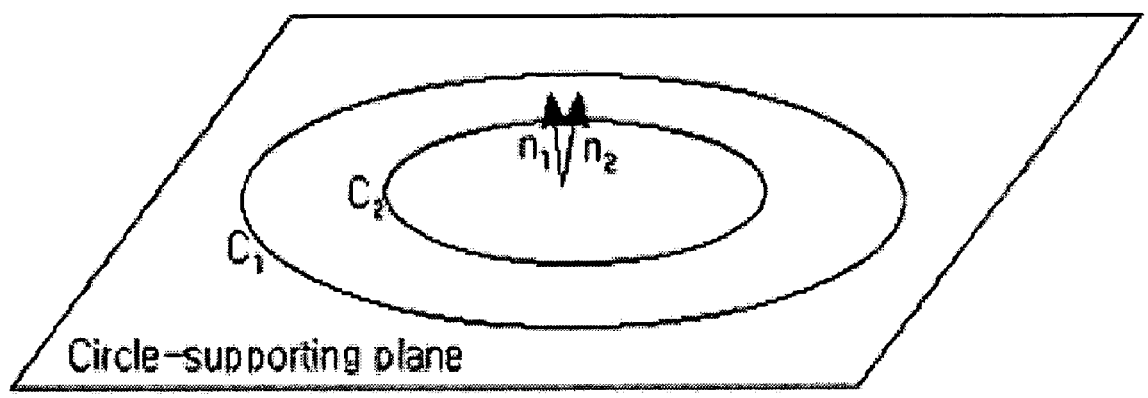
FIG. 8 illustrates the case where the normal vector on each central point of two projected concentric circles is not the same.

FIG. 3 is a conceptual view showing the images of a concentric circle pattern taken at different angles in a method of calibrating camera intrinsic parameters using a concentric circle pattern according to one embodiment of the present invention. FIG. 4a illustrates two images showing a concentric circle taken at different angles. FIG. 4b illustrates images where boundary lines are extracted from the ellipses in FIG. 4a. FIG. 5 is an image showing the central points of the ellipses in FIG. 4b; FIG. 6 is an image showing a straight line connecting the central points of the ellipses in FIG. 5; FIG. 7 illustrates a position relation of the points on the straight line in FIG. 6; and FIG. 8 shows projected concentric circles and its supporting plane. $n_1$ and $n_2$ represent calculated normal vectors from ellipses $C_1$ and $C_2$ using incorrect estimates of the intrinsic parameters.

As shown in FIG. 3, a concentric circle pair located in a 3D space has the following geometric conditions.

1) The center of the two circles are located at the same coordinate, 2) the two circles are located in the same plane, 3) the radiuses of the two circles are different. An image of the concentric circle having this geometric structure is taken using a camera.

Meanwhile, a concentric circle consisting of a circle having a smaller radius and a circle having a larger radius including the smaller circle has the same normal vector and a distance according to the above condition 2).

Two images of this concentric circle pattern are taken by one camera at different angles to obtain two sheets of image information. A concentric circle projected at a given angle has a shape of an ellipse, as shown in FIG. 4a to FIG. 5. Generally, the central points of two ellipses do not match. This is because two ellipses obtained by projecting concentric circles at different angles have different shapes according to the angle of projection. The slant of the straight line including the central points of the two ellipses varies depending on the projection angle of the camera. Meanwhile, in the drawings, the central point of an ellipse is a middle point of the straight line connecting two focuses, that is, the point at which the long axis and short axis of the ellipse meet.

Meanwhile, as mentioned above, the straight line connecting the central points of the ellipses projected from a 3D concentric circle can be represented by the following Equation 1.

First, a projection transformation (T) into a homogenous coordinate system widely used in image processing and projection geometry can be represented into a projection matrix as Equation 1.

$$T = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \quad (1)$$

According to invariable characteristic of a circle which is a trace of points located at a constant distance (radius) from a central point, two concentric circles satisfying the above geometric condition can be represented by following Equation 2.

$$(X-x_0)^2+(Y-y_0)^2=r^2,\ Z=0 \quad (2)$$

where, $x_o$ and $y_0$ are the central point coordinates of the circle, r is the radius of the circle and Z is a value of the vertical axis with respect to the plane.

At this time, using the condition Z=0, a general projection equation is converted into a two-dimensional transformation (II) between an image plane and a plane where Z=0 as in Equation 3.

$$\begin{bmatrix} sx \\ sy \\ s \end{bmatrix} = \begin{bmatrix} p_{11} & p_{12} & p_{13} & p_{14} \\ p_{21} & p_{22} & p_{23} & p_{24} \\ p_{31} & p_{32} & p_{33} & p_{34} \end{bmatrix} \begin{bmatrix} X \\ Y \\ 0 \\ 1 \end{bmatrix} = \begin{bmatrix} p_{11} & p_{12} & p_{14} \\ p_{21} & p_{22} & p_{24} \\ p_{31} & p_{32} & p_{34} \end{bmatrix} \begin{bmatrix} X \\ Y \\ 1 \end{bmatrix} \quad (3)$$

where, X,Y indicate actual 3D coordinates in projection geometry theory, x, y indicate coordinates in the projected image, s is a scale factor, and p is a value of the projection transformation matrix.

Also, rearranging Equation 3 in order to obtain an equation of the projected image Equation 4 is obtained.

$$s\begin{bmatrix} X \\ Y \\ 1 \end{bmatrix} = \begin{bmatrix} p_{11} & p_{12} & p_{14} \\ p_{21} & p_{22} & p_{24} \\ p_{31} & p_{32} & p_{34} \end{bmatrix}^{-1} \begin{bmatrix} x \\ y \\ 1 \end{bmatrix} = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \begin{bmatrix} x \\ y \\ 1 \end{bmatrix} \quad (4)$$

Considering the homogeneous characteristic of the coordinate system in Equation 4, multiplying terms of Equation 4 are deleted and Equation 2 is substituted to obtain the following Equation 5.

$$\left(\frac{\alpha_{11}x+\alpha_{12}y+\alpha_{13}}{\alpha_{31}x+\alpha_{32}y+\alpha_{33}}-x_0\right)^2 + \left(\frac{\alpha_{21}x+\alpha_{22}y+\alpha_{23}}{\alpha_{31}x+\alpha_{32}y+\alpha_{33}}-y_0\right)^2 = r^2 \quad (5)$$

Meanwhile, Equation 5 may be rearranged to obtain an equation of an ellipse. Then, the coordinate of the central point of the projected image can be obtained by following Equation 6.

$$(X',Y') = \left(\frac{C'+r^2D'}{A'+r^2B'},\ \frac{E'+r^2F'}{A'+r^2B'}\right) \quad (6)$$

Where, A', B', C', D', E' and F' consist of a combinations of factors $\alpha_{ij}$ in Equation 5 and r is a radius constant of the circle. As can be seen from Equation 6, A', B', C', D', E' and F' are independent from r.

A straight line connecting the central points of the projected images is defined as Equation 7 using the coordinates of the central points of the projected images calculated by Equation 6.

$$(B'E'-A'F')X'+(A'D'-B'C')Y'+(D'E'+F'C')=0 \quad (7)$$

Equation 7 is an equation of the straight line including only constant coefficients with respect to r. This means that the central points of the projected images obtained as a result of the projection is located on the straight line defined independently from the radius of the circle, where X', Y' are coordinates of the centers of the projected images. As the center of the original concentric circle is same to the center of the projected image when r=0 in Equation 2, the center of the circle is also located on the straight line defined by Equation 7.

From the relation that the central points of the projected images are located on one straight line, an algorithm to find the coordinate of the central point of the projected image will be now described in detail.

It is defined that the crossing points of the internal projected image and the straight line are A, B, the crossing points of the external projected image and the straight line are A', B', the central point of the projected circle is O and a given point separated infinitely on the straight line is $M_\infty$. Location of these points can be found in FIG. 6 and FIG. 7 and this positional relation is same in 3D and 2D spaces.

Meanwhile, a given point infinitely separated from the center of the projected image O on the straight line is a point virtually set and is frequently used in projection theory. This point is typically used because it is easy to serve as the boundary value of a condition and it has a characteristic limiting the cross ratio.

Therefore, a cross ratio Cr (A, O, B and $M_\infty$) and Cr (A', O, B' and $M_\infty$) are same, which is calculated in the same manner in a 3D space by Equation 8.

$$Cr(A, O, B, M_\infty) = \frac{\overline{BAM_\infty O}}{\overline{BOM_\infty A}} = 2 \quad (8)$$

$$Cr(A', O, B', M_\infty) = \frac{\overline{B'A'M_\infty O}}{\overline{B'OM_\infty A'}} = 2$$

Where, the points that can be found in the image are A, B, A' and B', and Equation 8 has two variables of points O and $M_\infty$. These two points are commonly used in the two Equations of Cr (A, O, B and $M_\infty$) and Cr (A', O, B' and $M_\infty$). Therefore, two variables and two equations can be obtained. As a result, the coordinate of point O can be obtained by solving the two Equations.

Meanwhile, when a circle is taken by a camera where an arbitrary principal point and an arbitrary focal length are preset, it is possible to calculate a normal vector of a projected image, and a distance between the camera and a central point of the projected image. Therefore, according to the present invention, a principal point $u_0$, $v_0$ and focal length $f$ can be optimized using a nonlinear minimizing method based on the normal vector of the projected image, the distance between the central point and the camera, and a radius of the projected image.

Specifically, the present invention introduces a cost function defined as below Equation 9. According to the present invention, calibration is performed so as to find intrinsic parameters $u_0$, $v_0$ and $f$ which minimize the value of Equation 9.

$$F(u_0, v_0, f) = \alpha(\bar{n}_1 - \bar{n}_2)^2 + \beta(\bar{n}_3 - \bar{n}_4)^2 + \gamma(d_1 - d_2)^2 + \lambda(d_3 - d_4)^2 + \quad (9)$$

$$\rho_1 \sum |R_{C_1}(n_1, d_1) - R_1| + \rho_2 \sum |R_{C_2}(n_2, d_2) - R_2| +$$

$$\rho_3 \sum |R_{C_3}(n_3, d_3) - R_3| + \rho_4 \sum |R_{C_4}(n_4, d_4) - R_4|$$

Equation 9 is a cost function showing how correct a given arbitrary principal point and focal length are. It is more correct if the cost of Equation 9 is smaller, that is approximately "0". Therefore, until Equation 9 is minimized, the following steps are repeated:

The normal vector of the projected image and the distance between the camera and the central point of the projected image are calculated. Thereafter, a principal point and a focal length of the camera being newly given; and therefore, an optimum principal point and focal length which minimize the value of $F(u_0, v_0, f)$ can be obtained.

In Equation 9, $\bar{n}_1, \bar{n}_2$ is each normal vector of small circle and large circle in a first projected concentric circle, and these normal vectors are 'assumed' by given intrinsic parameters $u_0, v_0, f$.

$\bar{n}_3, \bar{n}_4$ is each normal vector of small circle and large circle in a second projected concentric circle, and these normal vectors are 'assumed' by given intrinsic parameters $u_0, v_0, f$.

$d_1, d_2$ is each distance from the central point of small circle and large circle in the first projected concentric circle to the camera, and these distances are 'assumed' by given intrinsic parameters $u_0, v_0, f$.

$d_3, d_4$ is each distance from the central point of small circle and large circle in the second projected concentric circle, and these distances are 'assumed' by given intrinsic parameters $u_0, v_0, f$.

$R_{C_1}(n_1, d_1)$ is an 'assumed' distance between one point on the projected image $C_1$ and the central point of the projected image $C_1$. $R_{C_1}$ will be a radius of the small circle if the intrinsic parameters fit exactly. Since this value could also apply to points on the projected image, summation is adopted to calculate sum of calculated errors in all points. The same applies to $R_{C_2}(n_2, d_2)$ $R_{C_3}(n_3, d_3)$ and $R_{C_4}(n_4, d_4)$.

$\alpha, \beta, \gamma, \lambda, \rho_1, \rho_2, \rho_3, \rho_4$ are weighting factors representing the confidence of each constraint. The value of each factor is given by all "1" basically. However, $\rho_1, \rho_2, \rho_3, \rho_4$ can be set up to zero "0" if information about radius of the circle $R_1$, $R_2$, $R_3$ and $R_4$, is not given.

As shown in FIG. 8, because of erroneous estimates of the intrinsic parameters, the normal vector and distance to the circle-supporting plane are not the same in spite of the same plane.

In Equation 9, $u_0$, $v_0$ and $f$, respectively indicate a principal point and a focal length of the camera. The first two items, $\alpha(\bar{n}_1-\bar{n}_2)+\beta(\bar{n}_3-\bar{n}_4)$, indicate that two concentric circles have the same normal vector and next two items, $\gamma(d_1-d_2)+\lambda(d_3-d_4)$, indicate that two concentric circles are located on the plane having the same distance. In addition, the next four items $\rho_1 \Sigma|R_{C_i}(n_1,d_1)-R_1|+\rho_2\Sigma|R_{C_i}(n_2,d_2)-R_2|+\rho_3\Sigma|R_{C_3}(n_3,d_3)-R_3|+\rho_4\Sigma|R_{C_{ii}}(n_4,d_4)-R_4|$ indicate that a radius obtained from given intrinsic parameters is same as the actual radius. Therefore, FIG. 3 is illustrates an example that shows such an ideal case.

EXPERIMENTAL EXAMPLE

A concentric circle is drawn on the plane so that the central points of two circles having a radius of 40 mm and 80 mm, respectively are located at one point. Also, as shown in FIG. 4a and FIG. 4b, image of the circle is taken at two different angles to obtain two images. An XC-003 camera manufactured by SONY, with a focal radius of 8 mm was used.

After obtaining two projection images (containing the boundary lines), a calibration value as shown in Table 1 is obtained by means of a camera calibration method using the concentric circle pattern according to the present invention.

TABLE 1

| Class | $u_O$ | $v_O$ | $\alpha_u$ | $\alpha_v$ |
|---|---|---|---|---|
| Comparative example (Z. Zhang) | 306.70 | 240.44 | 1104.2 | 1112.5 |
| Embodiment of the present invention | 309.37 | 246.01 | 1104.7 | 1110.7 |

The comparative example (Z. Zhang) in Table 1 shows the calibrated values according to the camera calibration method taught in an article Z. Zhang, "Flexible Camera Calibration by Viewing a Plane From Unknown Orientations", *In Proc. 7th International Conference Computer Vision, Corfu, Greece*, pp. 666–673, September 1999. Table 1 shows that the calibration value calculated using a concentric circle pattern is similar to the calibration value in the comparative example of Z. Zhang.

As mentioned above, the method of calibrating intrinsic parameters of a camera using a concentric circle pattern according to the present invention provides the calibration intrinsic parameters of the camera from images of a 2D concentric circle taken from different angles. Thus, the present invention has an advantage that a concentric circle pattern which is easy to manufacture and maintain.

Also, the method of calibrating internal parameters of a camera using a concentric circle pattern according to the present invention calculates camera calibration intrinsic parameters using a plurality of Equations. Therefore, the present invention has an advantage that it can easily calibrate a camera by calculating the calibration intrinsic parameters.

The present invention has been described with reference to a particular embodiment in connection with a particular application. Those having ordinary skill in the art and access to the teachings of the present invention will recognize additional modifications and applications within the scope thereof. It is therefore intended by the appended claims to cover any and all such applications, modifications, and embodiments within the scope of the present invention.

What is claimed are:

1. A method of calibrating a camera using projection invariable characteristic of a concentric circle in order to calibrate the camera through a calculation of camera's intrinsic parameters, the method comprises steps of:

a) taking a plurality of images of a calibration pattern consisting of two or more concentric circles located at a same plane and having different radiuses at different angles to obtain projected images resulted from the projection of the concentric circles;

b) calculating central points of the projected images using a given algorithm; and c) calculating an optimum principal point ($u_0$, $v_0$) and focal length ($f$) of the camera using a nonlinear minimizing method based on a given principal point and focal length, which are the camera's intrinsic parameters, and the central point of the projected images calculated in the step b), wherein the concentric circle includes two circles and the step b) includes the steps of:

d) calculating the central points (O) of the two projected images obtained from the step a) to obtain a straight line passing through the central points;

e) calculating crossing points of the straight line and the two projected images; and f) calculating the central point of the projected images using a cross ratio depending on the central point (O) of the projected images, a given point ($M_\infty$) infinitely separated from the central point (O) on the straight line passing through the central points (O), and the crossing points of the straight line and the projected images.

2. The method of claim 1, wherein the step d) calculates the straight line passing through the centers of the projected images by Equation 1:

(B'E'−A'F')X'+(A'D'−B'C')Y'+(D'E'+F'C')=0

(where A', B', C', D', E' and F' are constants with respect to the radius of the circle and, X',Y' are the coordinates of the center of the projected image.).

3. The method of claim 2, wherein the step f) calculates the central point of the projected image by Equation 2:

$$Cr(A, O, B, M_\infty) = \frac{\overline{BAM_\infty O}}{\overline{BOM_\infty A}} = 2$$

$$Cr(A', O, B', M_\infty) = \frac{\overline{B'A'M_\infty O}}{\overline{B'OM_\infty A'}} = 2$$

(where A,B are the coordinates of crossing points of an projected image generated by projection of smaller circle and the straight line, A',B' are the coordinates of crossing points of an projected image generated by projection of an external circle surrounding the smaller circle and the straight line, and $M_\infty$ is a given point separated infinitely on the straight line.).

4. The method of claim 2, wherein said step c) includes the steps of:

g) assuming that normal vectors ($\bar{n}$) of the plane and distance (d) to the plane from a central coordinate of the camera of each of the central point calculated in the step b) based on a given principal point ($u_0$, $V_0$) and focal length ($f$) of the camera;

h) calculating F($u_0$, $v_0$, $f$) by applying the normal vectors and distance which were assumed from the step g) to a cost function defined as below Equation 3; and i) setting up a new principal point and focal length of the camera and repeating the steps g) and h) until F($u_0$,$v_0$, $f$) is minimized:

$$F(u_0, v_0, f) = \alpha(\bar{n}_1 - \bar{n}_2)^2 + \beta(\bar{n}_3 - \bar{n}_4)^2 + \gamma(d_1 - d_2)^2 + \lambda(d_3 - d_4)^2 +$$
$$\rho_1 \sum |R_{C_1}(n_1, d_1) - R_1| + \rho_2 \sum |R_{C_2}(n_2, d_2) - R_2| +$$

-continued
$$\rho_3 \sum |R_{C_3}(n_3, d_3) - R_3| + \rho_4 \sum |R_{C_4}(n_4, d_4) - R_4|$$

(where $R_i$ is radius of the circle i, and $R_{ci}$ ($n_i$,$d_i$) is radius estimation function between points of the projected image Ci and center of the projected image. α, β, γ, λ, $\rho_1$,$\rho_2$, $\rho_3$, and $\rho_4$ are the weighting factors representing the confidence of each constraint.).

5. A system for calibrating intrinsic parameters of a camera using projection invariable characteristic of a concentric circle in order to calibrate the camera through a calculation of camera's intrinsic parameters, comprising:

a camera that an arbitrary principal point and an arbitrary focal length are preset;

a calibration pattern located on a same plane and consisting of two or more concentric circles having different radiuses, said pattern being taken by the camera in order to calibrate the camera's intrinsic parameter; and a controller for calculating a straight line connecting the central points of the projected images obtained by projecting the calibration pattern to the camera at a given angle, and finding crossing points of the straight line and the projected images to obtain the central point coordinate of the projected images using a cross ratio (Cr), and calculating an optimum principal point ($u_0$, $v_0$) and focal length ($f$) of the camera using a nonlinear minimizing method based on the obtained principal point and focal length, which are the camera's intrinsic parameters, wherein, the controller assuming that normal vectors ($\bar{n}$) of the plane and distance (d) from a central coordinate of the camera of each of the calculated central point based on a principal point ($u_0$, $v_0$) and focal length ($f$) of the camera, calculating F($u_0$, $v_0$,$f$) by applying the assumed normal vectors and focal length to a cost function defined as below Equation 3, and setting up an optimum principal point and focal length of the camera when F($u_0$, $v_0$,$f$) is minimized:

$$F(u_0, v_0, f) = \alpha(\bar{n}_1 - \bar{n}_2)^2 + \beta(\bar{n}_3 - \bar{n}_4)^2 + \gamma(d_1 - d_2)^2 + \lambda(d_3 - d_4)^2 +$$
$$\rho_1 \sum |R_{C_1}(n_1, d_1) - R_1| + \rho_2 \sum |R_{C_2}(n_2, d_2) - R_2| +$$
$$\rho_3 \sum |R_{C_3}(n_3, d_3) - R_3| + \rho_4 \sum |R_{C_4}(n_4, d_4) - R_4|$$

(where $R_i$ is radius of the circle i, and $R_{ci}$ ($n_i$, $d_i$) is radius estimation function between points of the projected image Ci and center of the projected image. α, β, γ, λ, $\rho_1$, $\rho_2$, $\rho_3$, and $\rho_4$ are the weighting factors representing the confidence of each constraint.).

6. The system of claim 5, wherein said camera is a CCD camera.

* * * * *